(12) United States Patent
Fang

(10) Patent No.: US 10,823,292 B2
(45) Date of Patent: Nov. 3, 2020

(54) VALVE

(71) Applicant: SHANGHAI HONGYAN RETURNABLE TRANSIT PACKAGINGS CO., LTD, Shanghai (CN)

(72) Inventor: Zhengwei Fang, Shanghai (CN)

(73) Assignee: SHANGHAI HONGYAN RETURNABLE TRANSIT PACKAGINGS CO., LTD, Shanghai (CN)

( * ) Notice: Subject to any disclaimer, the term of this patent is extended or adjusted under 35 U.S.C. 154(b) by 190 days.

(21) Appl. No.: 16/072,099

(22) PCT Filed: Jan. 20, 2017

(86) PCT No.: PCT/CN2017/071942
§ 371 (c)(1),
(2) Date: Jul. 23, 2018

(87) PCT Pub. No.: WO2017/125075
PCT Pub. Date: Jul. 27, 2017

(65) Prior Publication Data
US 2019/0040961 A1 Feb. 7, 2019

(30) Foreign Application Priority Data

Jan. 22, 2016 (CN) .......................... 2016 1 0044745

(51) Int. Cl.
*F16K 1/20* (2006.01)
*F16K 31/60* (2006.01)
(Continued)

(52) U.S. Cl.
CPC .......... *F16K 1/2007* (2013.01); *F16K 1/2014* (2013.01); *F16K 1/36* (2013.01);
(Continued)

(58) Field of Classification Search
CPC ........ F16K 1/2007; F16K 1/2014; F16K 1/36; F16K 1/18; F16K 27/0227; F16K 31/535; F16K 31/602; F16K 31/52441
See application file for complete search history.

(56) References Cited

U.S. PATENT DOCUMENTS

| 1,477,023 A | 12/1923 | Anderson |
| 2,200,474 A | 5/1940 | Heggem |

(Continued)

FOREIGN PATENT DOCUMENTS

| CN | 102011887 A | 4/2011 |
| CN | 202215771 A | 5/2012 |

(Continued)

OTHER PUBLICATIONS

International Search Report and Written Opinion, International Patent Application No. PCT/CN2017/071942, dated Apr. 24, 2017, with English translation of search report (12 pages).

*Primary Examiner* — Jessica Cahill
*Assistant Examiner* — Patrick C Williams
(74) *Attorney, Agent, or Firm* — Hamre, Schumann, Mueller & Larson, P.C.

(57) ABSTRACT

A valve includes a valve body, a valve rod, a valve seat, and a valve core assembly. The valve core assembly is mounted inside the valve body and includes a valve core. The valve core is articulated to the valve body, and the valve core assembly further includes a drive member, a positioning member, and a flexible member. The positioning member is mounted on the valve core such that it may move relative to same. The flexible member is mounted between the positioning member and the valve core; thus the drive member has a separable fitting relationship with the positioning member.

10 Claims, 14 Drawing Sheets

(51) Int. Cl.
*F16K 31/53* (2006.01)
*F16K 27/02* (2006.01)
*F16K 31/524* (2006.01)
*F16K 1/36* (2006.01)
*F16K 1/18* (2006.01)

(52) U.S. Cl.
CPC .... *F16K 27/0227* (2013.01); *F16K 31/52441* (2013.01); *F16K 31/535* (2013.01); *F16K 31/602* (2013.01)

(56) References Cited

U.S. PATENT DOCUMENTS

| | | | | |
|---|---|---|---|---|
| 2,934,310 | A * | 4/1960 | Kinney | F16K 1/24 |
| | | | | 251/163 |
| 4,141,536 | A | 2/1979 | Graham | |
| 4,313,592 | A * | 2/1982 | Baas | F16K 1/24 |
| | | | | 251/162 |
| 6,220,568 | B1 * | 4/2001 | Wu | B05B 1/3013 |
| | | | | 251/114 |
| 2006/0162659 | A1 * | 7/2006 | Schussler | C23C 14/566 |
| | | | | 118/719 |
| 2013/0228242 | A1 * | 9/2013 | Languedoc | F16K 1/2007 |
| | | | | 137/527 |
| 2019/0345021 | A1 * | 11/2019 | Kuehn | F16K 31/20 |

FOREIGN PATENT DOCUMENTS

| | | |
|---|---|---|
| CN | 103363127 A | 10/2013 |
| CN | 104595517 A | 5/2015 |
| CN | 204437307 U | 7/2015 |
| CN | 105805321 A | 7/2016 |

* cited by examiner

VALVE

FIELD

The present invention relates to a container, in particular to a valve.

BACKGROUND

For existing valves for medium-sized bulk storage containers, its flow is affected by the valve core and the shaft, and the sealing is poor, because their valve core is generally located inside the valve body, such as butterfly valves are opened by choosing rotating axle in the middle of the valve core, which drives the valve core to rotate on both sides to open and. Because of the friction between the butterfly valve seal and the valve body, the force for opening and closing the valve is relatively large.

Recently, a guide groove type lifter ball valve has been developed at home and abroad. The valve stem has an S-shaped guide groove, which cooperates with the guide pin to drive the ball out of the valve seat when the valve stem is raised, and then rotates 90° counterclockwise to completely open the valve. When the valve stem is lowered, the ball is driven to be rotated 90° clockwise and then pressed against the valve seat to close the valve. The disadvantage of this technology is that the valve stem has a long S-shaped guide groove. When rotating for opening and closing, the valve stem is required to be guided to spiral rise or fall in the guide groove, so that the guide groove takes up a large space and has a large rotation angle.

A patent discloses a disc-shaped double-track rotary and hoisted valve opening and closing structure, which is composed of a fixed disc, a rotating disc and a limit pin. When the external force drives the valve rod together with the rotating disc to drive the limit pin, the limit pin rotates clockwise along the trajectory of the "arc" track on the fixed disk. When rotating to the "straight" track connected by the "arc" track, the rotating disk continues to rotate clockwise. Under the positive force of the "supporting" track on the rotating disc, the limit pin is extended to the periphery of the fixed plate support along the "straight" track on the fixed disc. At this time, the limit pin and the valve sealing structure are closed to the valve seat, and the valve is closed. When the valve stem rotates counterclockwise along with the rotating disc, the limit pin and the sealing structure of the valve firstly follow the trajectory of the "straight" track on the fixed disc to gather toward the center of the fixed disc under the positive force of "supporting" track on the rotating disc. Then, according to the trajectory of the "arc" track on the fixed plate, the the limit pin and the sealing structure of the valve rotates counterclockwise, and the valve is opened. The technical disadvantage of the patent is that "the arc track connected to straight track" is required, which requires high precision, complicated processing technology, and the valve core is a combination, which is difficult to obtain a balanced pre-tightening force, which causes damage to the valve core and shortens the life of the valve.

A patent describes a rail-type plug valve, including a valve body, a valve cover, an operating member, a valve rod, a valve seat, a valve plug that forms a conical sealing joint with the valve seat, and a rail-type mechanism, wherein the rail-type mechanism consists of a track ring which is mounted on neck portion of the valve plug and has two guide groove and a double pin plate having two guide pins pinned into the guide groove, and also includes a lock nut and an adjustment ring for adjusting the installation position of the track ring. The disadvantage of this patent is that transmission structure is complicated, which occupies the outer space of the valve body; the transmission device involves many components and the assembly process is complicated; in addition, due to the valve plug of the conical sealing joint and the lock nut and the adjusting ring for adjusting the installation position of the rail ring, it requires multiple adjustments, thus the operation is complicated.

SUMMARY

The present invention aims to provide a valve to solve the above problems in the prior art.

To solve the above technical problem, according to one aspect of the present invention, a valve is provided. The valve comprises a valve body, a valve rod, a valve seat and a valve core assembly, the valve core assembly being mounted in the valve body and including a valve core, the valve core being hinged to the valve body, the valve core assembly further includes a drive member, a positioning member and a flexible member, wherein the positioning member is movably mounted on the valve core, and the flexible member is mounted between the positioning member and the valve core, and the drive member has a separable cooperating relationship with the positioning member, such that the valve has following three drive relationships while it is being closed:

the drive member cooperates with the positioning member to form a relatively static first transmission relationship under elastic action of the flexible member and drives the valve core to rotate to close the valve core; when the first transmission relationship ends, the drive member and the positioning member are switched from the first transmission relationship to a second transmission relationship, and the drive member presses the positioning member to make the positioning member perform relative movement with respect to the valve core; when the second transmission relationship ends, the drive member and the positioning member are switched from the second transmission relationship to a third transmission relationship between the drive member and the valve core, and the drive member controls the positioning member in an extended state, so that the positioning member is always in a state of being engaged with the valve body, and the drive member presses the valve core to perform a pressing movement toward the valve through-hole radial direction, thereby sealingly locking the valve core.

In one embodiment, the drive member is provided with a control cam, and an end of the positioning member is provided with a control cam engaging surface, wherein the control cam cooperates with the control cam engaging surface thereby realizing rotation of the drive member to drive the positioning member to slide.

In one embodiment, the valve core is provided with a connecting portion, and the connecting portion is provided with a first recess, and the drive member is installed in the first recess, and a hanging table is disposed on the drive member, and a hanging table mating surface is disposed in the first recess, and opening of the valve is realized by cooperation of the hanging table and the hanging table mating surface.

In one embodiment, a locking cam is further disposed on the drive member, and a locking boss is disposed at a bottom of the first recess of the valve core, wherein the locking cam cooperates with the locking boss to achieve the third transmission relationship.

In one embodiment, the valve core is provided with a positioning member guide rail, and the flexible member abuts against the positioning member and is mounted on the positioning member guide rail together with the positioning member.

In one embodiment, the positioning member rail is a mounting hole disposed in the valve core, and the positioning member is a positioning rod, and the flexible member is a spring, wherein one end of the spring abuts the mounting hole and the other end of the spring abuts a bottom of the positioning rod.

In one embodiment, the valve further comprises a valve rod, the drive member is provided with a first valve rod fitting hole, and both sides of the first recess of the connecting portion is disposed with a second valve rod fitting hole, and the valve rod extends into the first valve rod fitting hole and the second valve rod fitting hole, so that the rotation of the valve rod drives the drive member to rotate.

In one embodiment, the valve body is provided with a positioning member locking portion, and in the third transmission relationship, when the drive member controls the positioning member in an extended state, the positioning member locking portion limits position of the positioning member.

In one embodiment, the positioning member locking portion limits position of the positioning member in a vertical direction.

In one embodiment, the valve body is provided with a valve core mounting portion, and the valve core mounting portion is provided with a second recess, and both sides of the second recess are provided with a valve rod positioning hole, wherein the connecting portion of the valve core is installed in the second recess, and the valve rod passes through the valve rod positioning hole, the first valve rod fitting hole, the second valve rod fitting hole and the connecting portion, so as to rotatably mount the valve core in the valve body.

In one embodiment, the valve further comprises a handle provided with a driving gear, and the valve rod is provided with a driven gear for cooperating with the driving gear such that rotation of the handle drives the valve rod to rotate.

In one embodiment, the valve further comprises a flange and a cover, and the valve seat comprises an outer valve seat and an inner valve seat, wherein the outer valve seat is disposed between the valve body and the cover, and the inner valve seat is disposed between the valve core and the valve body, and the cover is disposed at an outlet end of the valve body, and the flange is disposed at an inlet end of the valve body.

According to another aspect of the present invention, a valve is further provided. The valve comprises a valve body, a valve rod, a valve seat and a valve core assembly, the valve core assembly being mounted in the valve body and including a valve core, the valve core being hinged to the valve body, wherein the valve core assembly further includes a drive member and a positioning member movably mounted on the valve core, and the drive member has a separable cooperating relationship with the positioning member, such that the valve has following two drive relationships while it is being closed:

the drive member cooperates with the positioning member to form a relatively static first transmission relationship under elastic action and drives the valve core to rotate to close the valve core; when the first transmission relationship ends, the drive member and the positioning member is switched from the first transmission relationship to a second transmission relationship, and the drive member presses the positioning member to cause the positioning member to perform relative movement with respect to the valve core and the positioning member in the state for cooperating with the valve body, thereby sealingly locking the valve body.

In one embodiment, the positioning member is provided with an elastic rib, and the elastic rib is integrally disposed on the positioning member.

In one embodiment, an flexible member is further included, and the flexible member is integrally formed with the positioning member, and the flexible member is an elastic rib disposed on an outer circumference of the positioning member.

In one embodiment, a flexible member is further included, and the flexible member is a compression spring, and the positioning member is a positioning rod, and the compression spring is sleeved on the positioning rod.

In one embodiment, the drive member is provided with a control cam, and an end of the positioning member is provided with a control cam engaging surface, wherein the control cam cooperates with the control cam engaging surface thereby realizing rotation of the drive member to drive the positioning member to slide.

In one embodiment, the valve core is provided with a connecting portion, and the connecting portion is provided with a first recess, and the drive member is installed in the first recess, and a hanging table is disposed on the drive member, and a hanging table mating surface is disposed in the first recess, and opening of the valve is realized by cooperation of the hanging table and the hanging table mating surface.

In one embodiment, a locking cam is further disposed on the drive member, and a locking boss is disposed at a bottom of the first recess of the valve core, wherein the locking cam cooperates with the locking boss to achieve the third transmission relationship.

In one embodiment, the valve core is provided with a positioning member guide rail, and the flexible member abuts against the positioning member and is mounted on the positioning member guide rail together with the positioning member.

The valve of the present invention has advantages of fewer component parts, a simple manufacturing process, a simple structure, and good utilization of space, which allows the valve to be minimized, while the valve opening torque is small and the sealing effect is excellent.

BRIEF DESCRIPTION OF DRAWINGS

FIGS. 9-13A are cross-sectional views of a valve showing the transmission relationship of the valve of the present invention during a closing process, according to an embodiment of the present invention; wherein FIGS. 9-9A shows the valve open state;

FIG. 10-10A shows a first transmission relationship;

FIGS. 11-12A illustrate a second transmission relationship; and

FIGS. 13-13A illustrate a third transmission relationship.

DETAILED DESCRIPTION OF EMBODIMENTS

Figure 1:
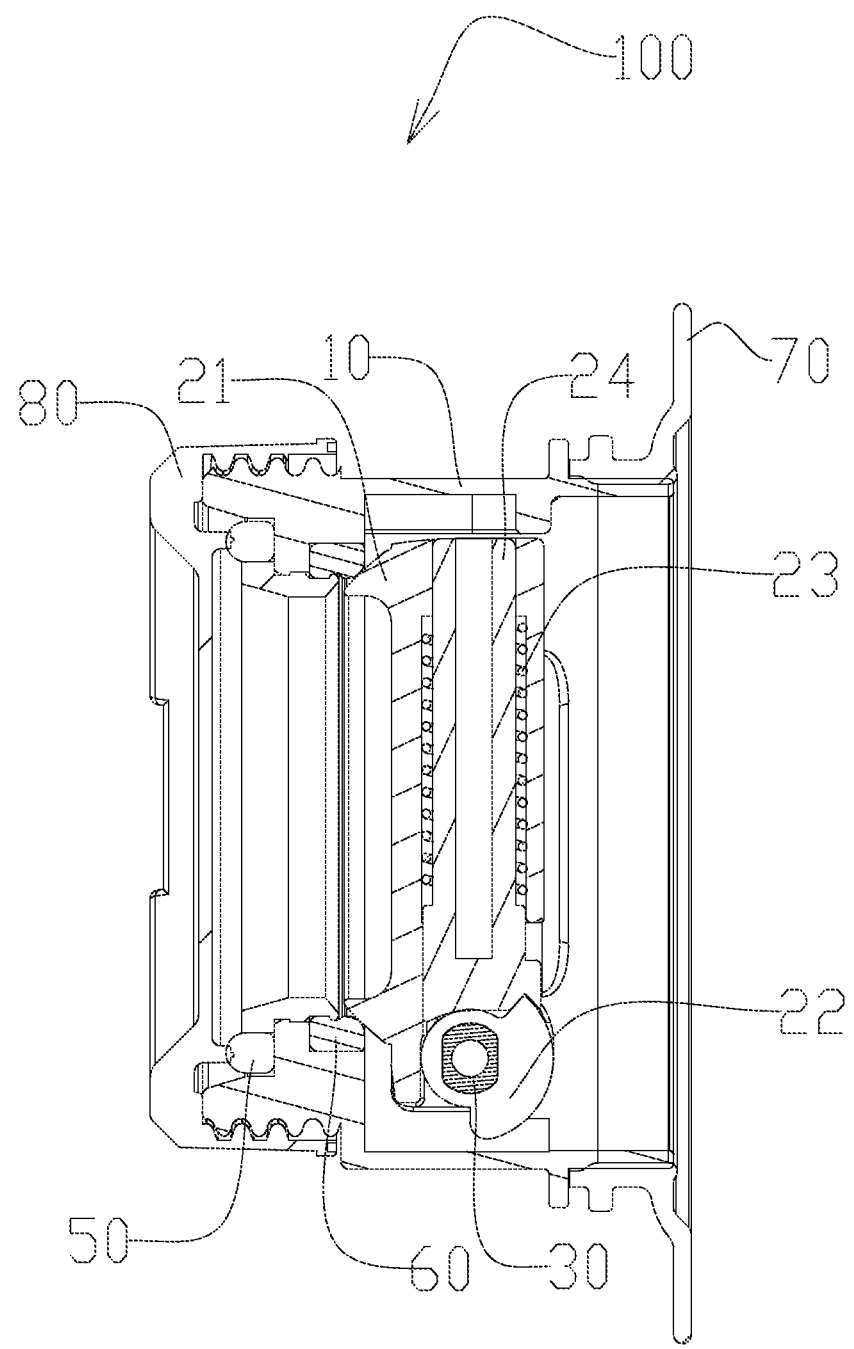
FIG. 1 is a cross-sectional view of a valve according to an embodiment of the present invention.

The preferred embodiments of the present invention will be described in detail with reference to the accompanying drawings. The embodiments shown in the drawings are not intended to limit the scope of the invention, but only to illustrate the spirit of the invention.

According to one aspect of the present invention, a valve generally comprises a valve body, a valve rod, a valve seat and a valve core assembly, the valve core assembly being mounted in the valve body and including a valve core, the valve core being hinged to the valve body, the valve core assembly further includes a drive member, a positioning member and an flexible member, wherein the positioning member is movably mounted on the valve core, and the flexible member is mounted between the positioning member and the valve core, and the drive member has a separable cooperating relationship with the positioning member, such that the valve has following three drive relationships while it is being closed:

the drive member cooperates with the positioning member to form a relatively static first transmission relationship under elastic action of the flexible member and drives the valve core to rotate to close the valve core; when the first transmission relationship ends, the drive member and the positioning member are switched from the first transmission relationship to a second transmission relationship, and the drive member presses the positioning member to make the positioning member perform relative movement with respect to the valve core; when the second transmission relationship ends, the drive member and the positioning member are switched from the second transmission relationship to a third transmission relationship between the drive member and the valve core, and the drive member controls the positioning member in an extended state, so that the positioning member is always in a state of being engaged with the valve body, and the drive member presses the valve core to perform a pressing movement toward the valve thrugh-hole radial direction, thereby sealingly locking the valve core.

According to another aspect of the present invention, a valve is further provided. The valve comprises a valve body, a valve rod, a valve seat and a valve core assembly, the valve core assembly being mounted in the valve body and including a valve core, the valve core being hinged to the valve body, wherein the valve core assembly further includes a drive member and a positioning member movably mounted on the valve core, and the drive member has a separable cooperating relationship with the positioning member, such that the valve has following two drive relationships while it is being closed:

the drive member cooperates with the positioning member to form a relatively static first transmission relationship under elastic action and drives the valve core to rotate to close the valve core; when the first transmission relationship ends, the drive member and the positioning member is switched from the first transmission relationship to a second transmission relationship, and the drive member presses the positioning member to cause the positioning member to perform relative movement with respect to the valve core and the positioning member in the state for cooperating with the valve body, thereby sealingly locking the valve core.

Preferred embodiments of the present invention will be described in detail below with reference to the accompanying drawings.

Figure 2:
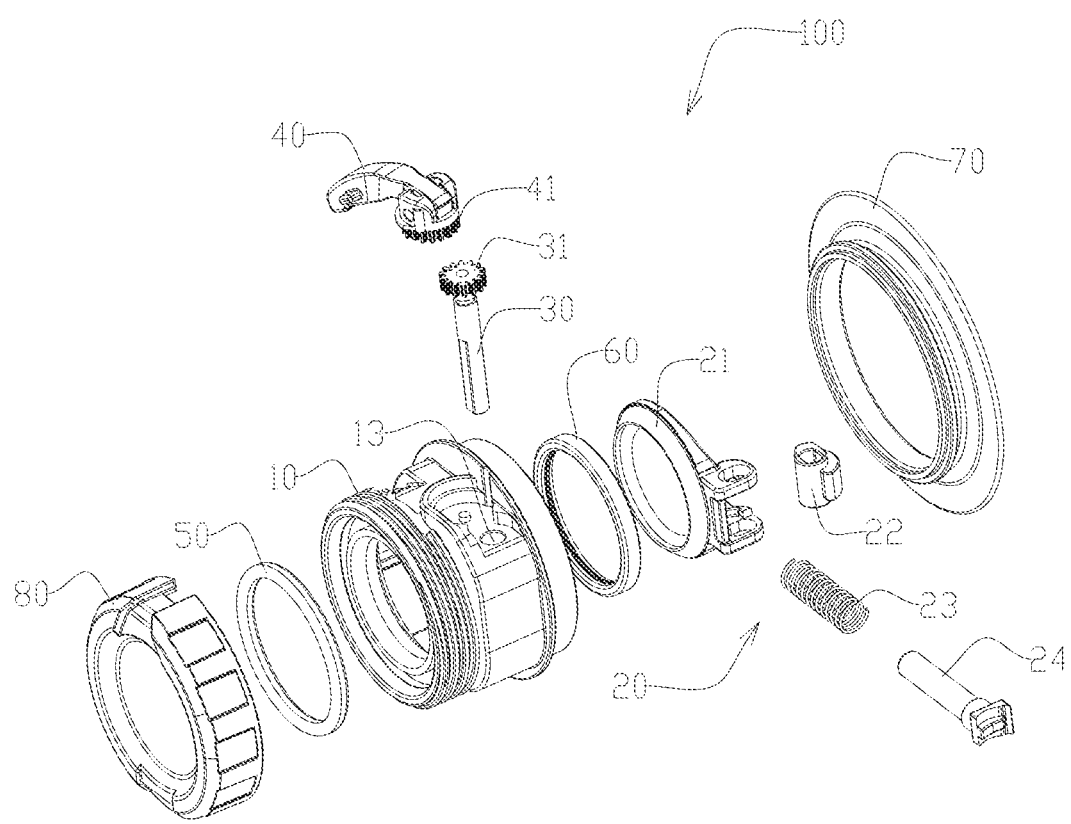
FIG. 2 is an exploded view of a valve according to an embodiment of the present invention.

FIG. 1 is a cross-sectional view of a valve according to an embodiment of the present invention, and FIG. 2 is an exploded view of the valve according to an embodiment of the present invention. As shown in FIGS. 1-2, the valve 100 includes a valve body 10, a valve core assembly 20, a valve rod 30, a handle 40, an outer valve seat 50, an inner valve seat 60, a flange 70, and a cover 80. The valve core assembly 20 includes a valve core 21, a drive member 22, an flexible member 23, and a positioning member 24. The valve core assembly 20 is mounted in the valve body 10, and the valve core 21 is hinged to the valve body 10. The outer valve seat 50 is disposed between the valve body 10 and the cover 80, the inner valve seat 60 is disposed between the valve core 21 and the valve body 10, the cover 80 is disposed at the outlet end of the valve body 10, and the flange 70 is disposed at the inlet end of the valve body 10. The handle 40 is provided with a driving gear 41. The valve rod 30 is provided with a driven gear 31. The driving gear 41 meshes with the driven gear 31, so that the rotation of the valve rod 30 can be driven by the rotation of the handle 40.

Figure 3:
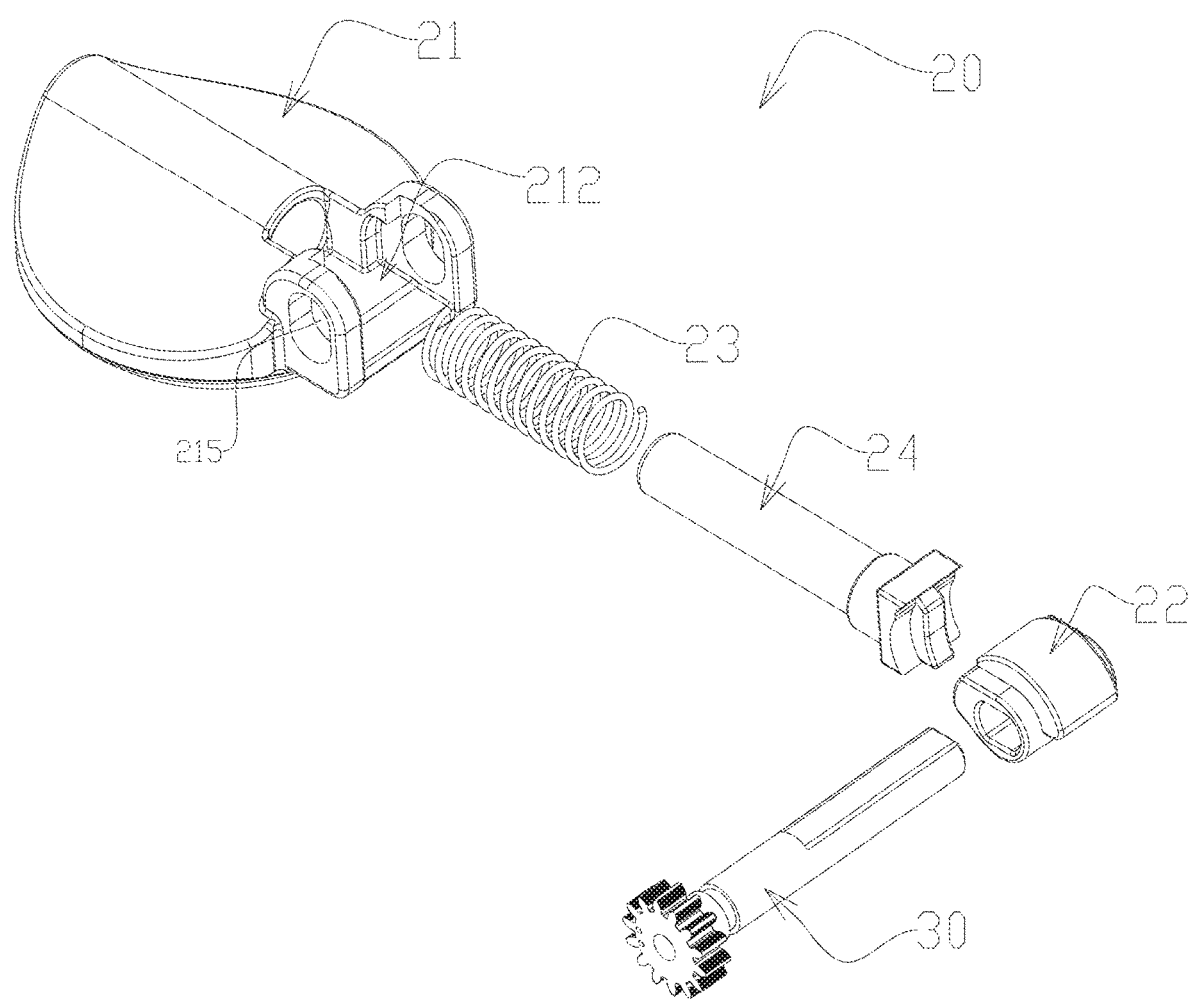
FIG. 3 is an exploded view of a valve core assembly according to an embodiment of the present invention.
Figure 4:
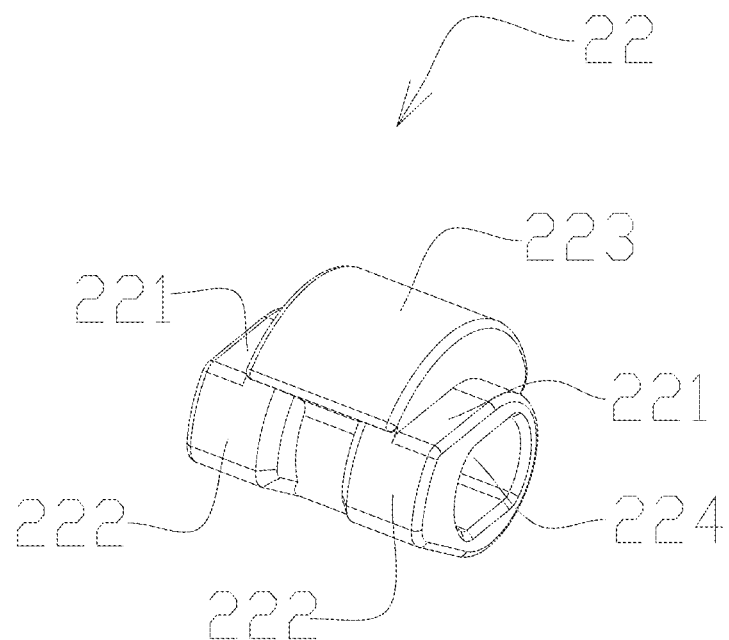
FIG. 4 is a perspective view of a drive member according to an embodiment of the present invention.
Figure 4A:
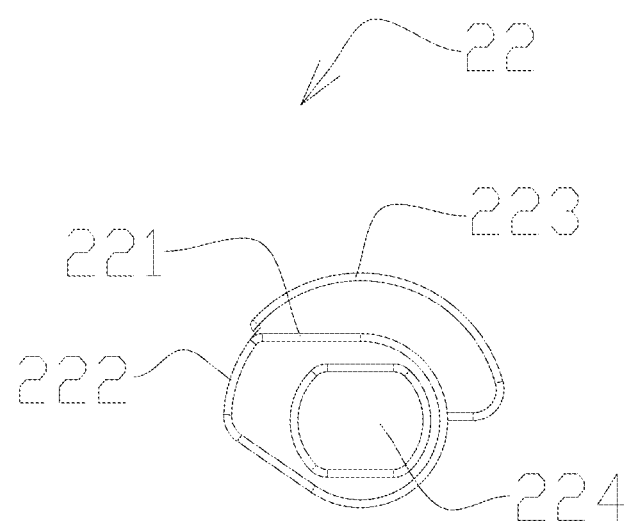
FIG. 4A is a left side view of a drive member according to an embodiment of the present invention.
Figure 5:
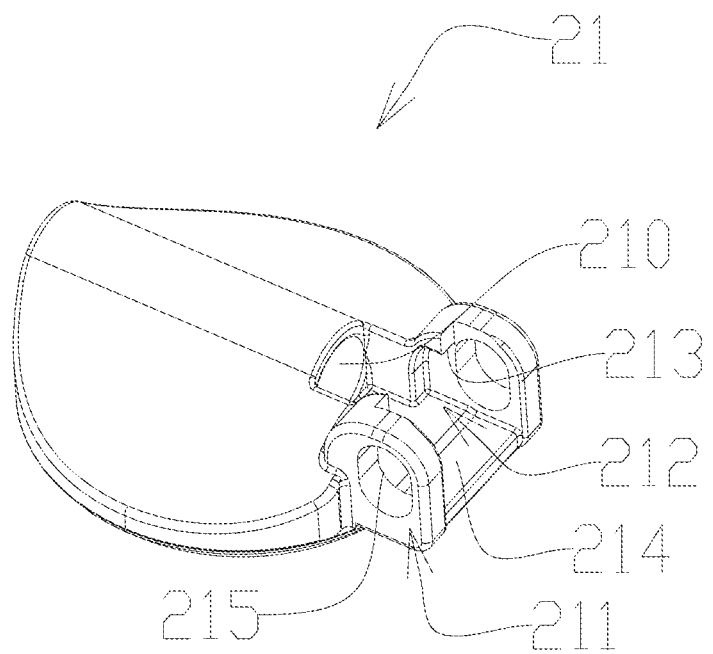
FIG. 5 is a perspective view of a valve core according to an embodiment of the present invention.
Figure 5A:
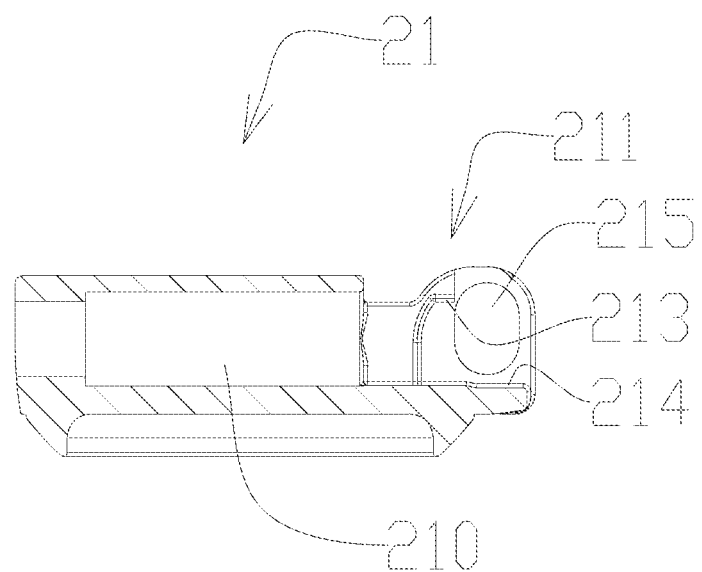
FIG. 5A is a cross-sectional view of a valve core according to an embodiment of the present invention.
Figure 6:
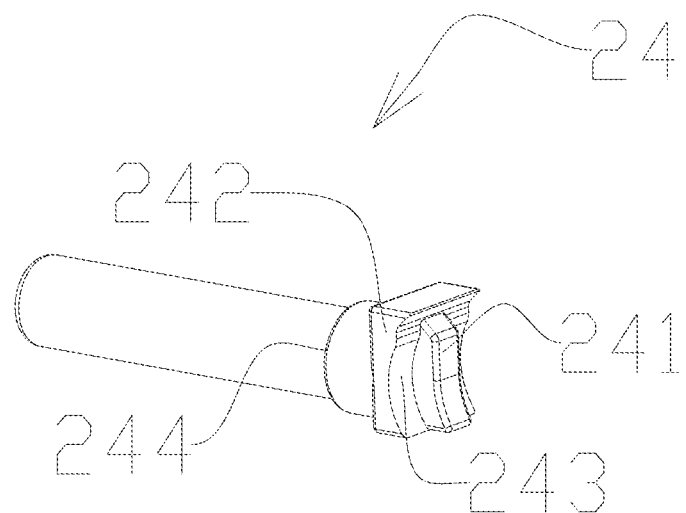
FIG. 6 is a perspective view of a positioning member according to an embodiment of the present invention.
Figure 6A:
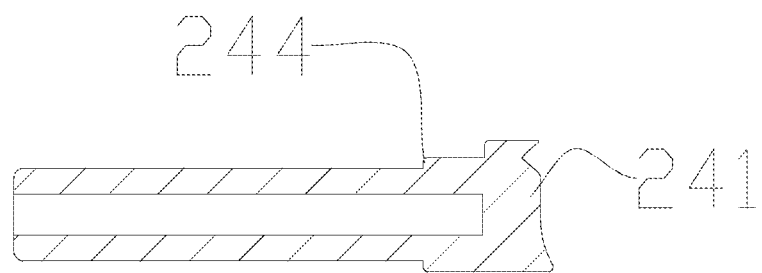
FIG. 6A is a cross-sectional view of a positioning member according to an embodiment of the present invention.
Figure 6B:
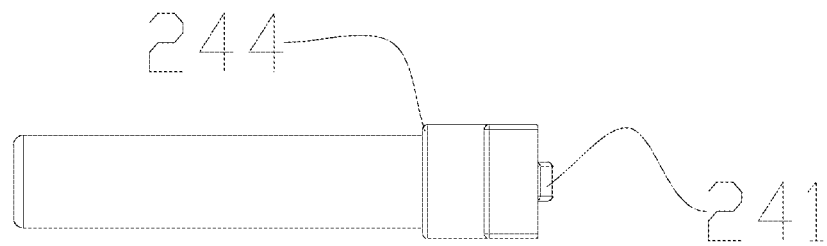
FIG. 6B is a front view of a positioning member according to an embodiment of the present invention.

FIG. 3 is an exploded view of the valve core assembly of the present embodiment, FIG. 4 is a perspective view of the drive member, FIG. 4A is a left side view of the drive member, FIG. 5 is a perspective view of the valve core, FIG. 5A is a cross-sectional view of the valve core, FIG. 6 is a perspective view of the positioning member, FIG. 6A is a cross-sectional view of the positioning member, and FIG. 6B is a front view of the positioning member.

As shown in FIGS. 3, 4 and 4A, the drive member 22 is provided with a hanging table 221, a locking cam 222, a control cam 223, and a first rod mounting hole 224. The control cam 223 is located at the middle of the drive member 22 and is configured to cooperate with the cam engaging surface 241 provided on the positioning member 24, so as to drive the positioning member to slide by the rotation of the drive member, and the hanging table 221 is disposed on both sides of the control cam 223 for cooperating with the hanging table mating surface 213 of the valve core 21, so as to realize the opening of the valve. The locking cam 222 is located behind the hanging table 221 for cooperating with the locking boss 214 of the valve core 21 to realize the third transmission. The first valve rod mounting hole 224 is formed through the drive member 22, and the valve rod 30 can extend into the first valve rod mounting hole 224, so that the drive member 22 can be rotated by the rotation of the valve rod 30, wherein the mating relationship between various portions of the drive member 22 and the valve core 21 and the positioning member 24 will be described in detail below.

As shown in FIGS. 3, 5 and 5A, the valve core 21 is provided with a guide rail 210. Preferably, the guide rail 210 is a hole extending transversely through the valve core 21, and the positioning member 24 extends into the guide rail 210 and is slidable within the guide rail 210. The valve core 21 is further provided with a connecting portion 211 formed through extending outward integrally from the edge of the valve core 21 at one end of the guide rail 210, and a first recess 212 is provided in the middle of the connecting portion 211. A locking boss 214 is disposed at the bottom of the first recess 212, a second valve rod fitting hole 215 is disposed at two sides of the first recess 212, and a hanging table mating surface 213 is disposed at a rear both sides of the first recess 212, wherein the first recess 212 is used for mounting the drive member 22, the locking boss 214 is used for engaging with the locking cam 222 of the drive member 22, the second valve rod fitting hole 215 is used for mounting the valve rod 30, and the hanging table mating surface 213 is used for mating with the control cam 223 of the hanging platform 221. The second valve rod fitting hole 215 has a larger diameter than the outer diameter of the valve rod 30, so that the valve rod 30 can be rotated in the second valve rod fitting hole 215, which will be described in detail below.

As shown in FIGS. 3, 6, 6A and 6B, the positioning member 24 has a cylindrical shape as a whole, and a protruding block is provided at one end of the positioning member 24. The end portion of the protruding block is provided with a cam engaging surface 241, which contacts with the control cam 223 of the drive member 22, so as to achieve the relative movement of the positioning member 24 relative to the valve core 21 by the rotation of the drive member 22. A flange 242 is provided on both sides of the protruding block, and a side of the flange 242 facing the protruding block is provided with a curved surface 243 for seating the locking cam 222 of the drive member 22. A limiting step 244 is further disposed on the positioning member 24. When the positioning member 24 moves in the guide rail 210 of the valve core 21, the limiting step 244 laterally limits the flexible member 23, so that a force can be applied on the positioning member 24 toward the drive member 22 by the flexible member 23, and thus the flexible member 23 can drive the positioning member 24 out of the valve body to unlock.

Although the guide rail 210 is a radial through hole provided in the valve core 21 in the present embodiment, those skilled in the art will appreciate that the guide rail 210 may be provided in other manners.

As shown in FIG. 3, during the installation, the flexible member 23 is sleeved on the positioning member 24 and laterally limited by the limiting step 244 at one end, and the drive member 22 is mounted in the first recess 212 of the valve core 21, and the first rod mounting hole 224 of the drive member 22 is aligned with the second rod fitting hole 215, and the valve rod 30 passes through the second rod fitting hole 215 on one side and the first rod mounting hole 224, and then passes through the second rod fitting hole 215 on the other side, thereby the valve core 21 is hinged with the drive member 22 and the positioning member 24 is movably restrained in the guide rail 210 of the valve core 21, wherein the valve rod 30 is fixedly coupled to the drive member 22, that is, the valve rod 30 cannot be rotated in the first valve rod mounting hole 224 of the drive member 22 but can be rotated in the second valve rod mounting hole 224 of the valve core 21, so that the rotation of the valve rod 30 can drive the rotation of the drive member 22, and thus the rotation of the valve rod 30 drives the drive member 22 to rotate and drives the positioning member 24 to move relative to the valve core 21.

Figure 7:
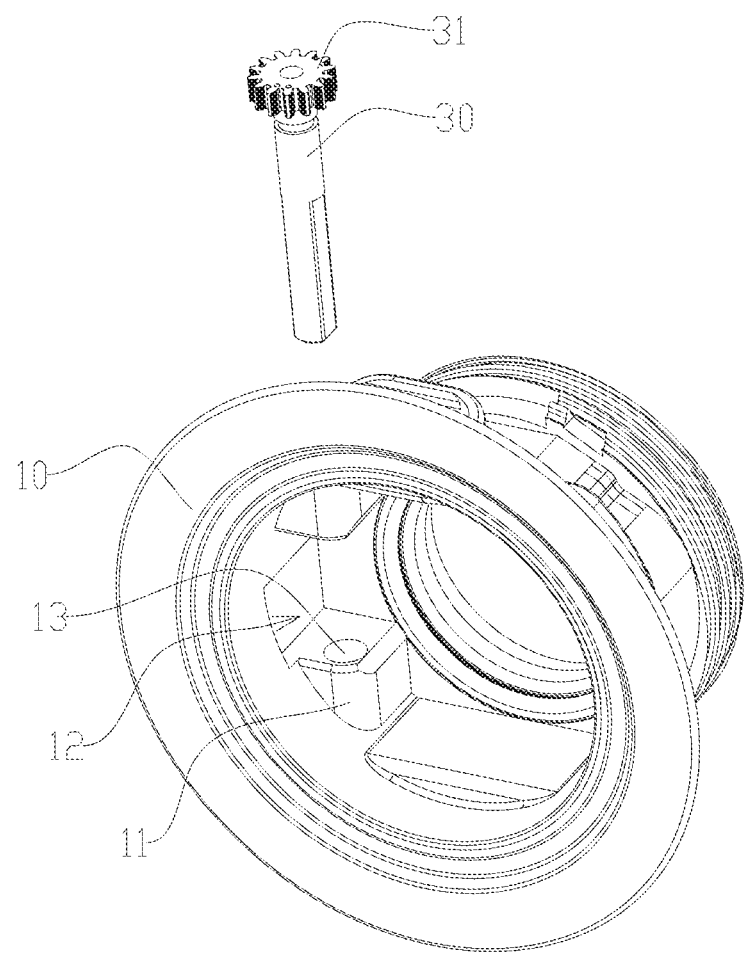
FIG. 7 is an exploded perspective view of a valve body mounted with a valve rod according to an embodiment of the present invention.
Figure 8:
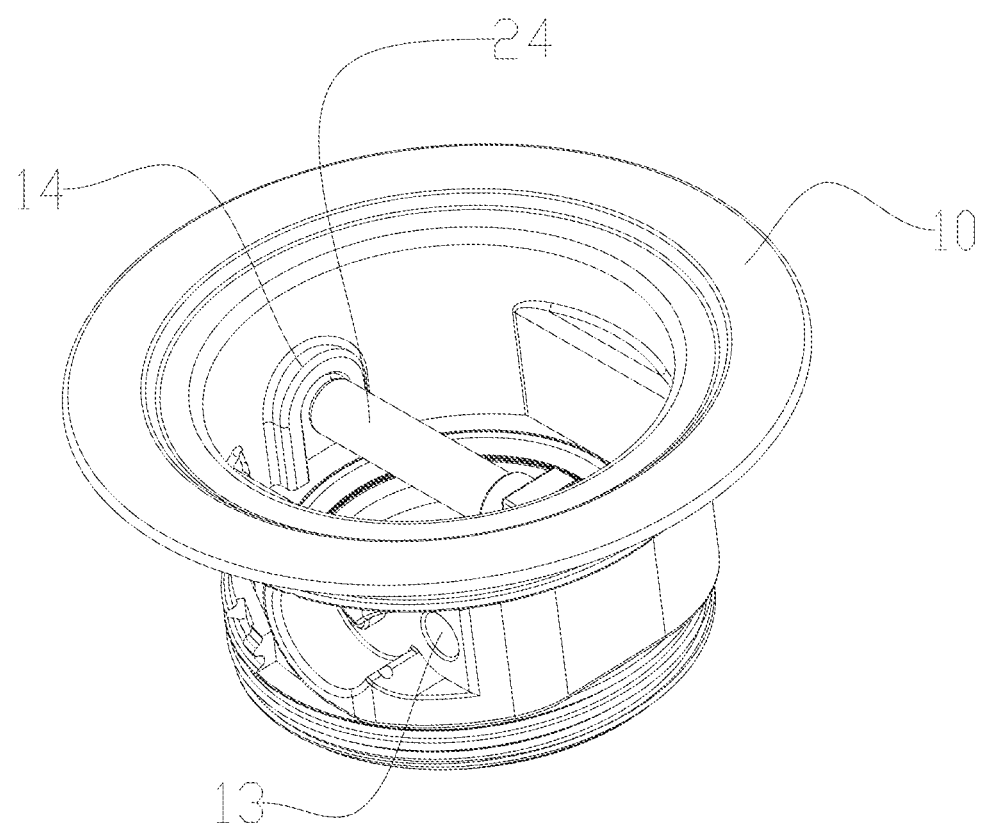
FIG. 8 is a perspective view of a valve body mounted with a positioning member according to an embodiment of the present invention.
Figure 8A:
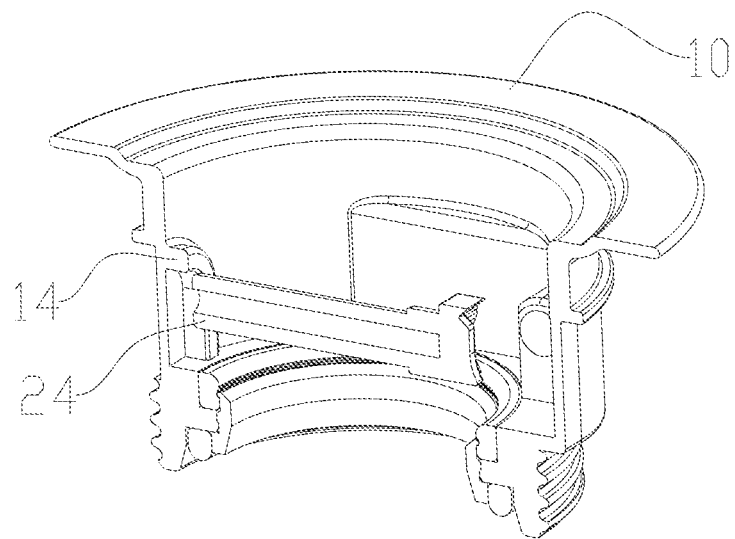
FIG. 8A is a cross-sectional view of the valve body of FIG. 8.
Figure 8B:
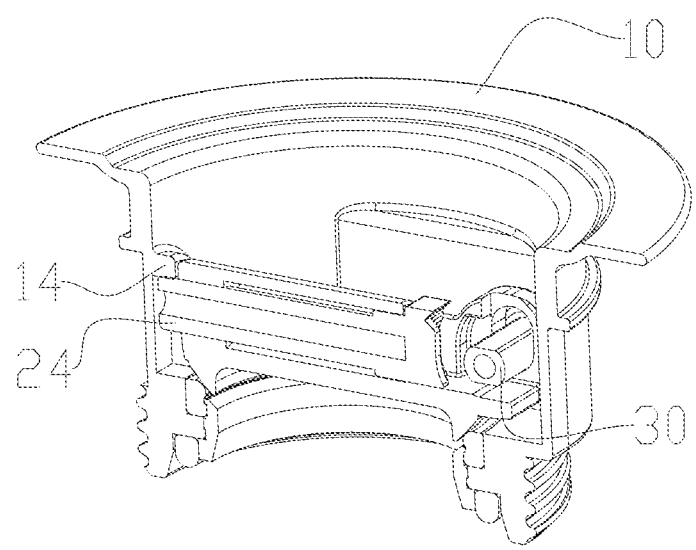
FIG. 8B is a cross-sectional view of a valve body mounted with a positioning member, a drive member, and a valve rod, according to an embodiment of the present invention.

FIG. 7 is an exploded perspective view of the valve body mounted with a valve rod, FIG. 8 is a perspective view of a valve body mounted with a positioning member, FIG. 8A is a cross-sectional view of the valve body of FIG. 8, and FIG. 8B is a cross-sectional view of the valve body mounted with the positioning member, the drive member, and the valve rod. As shown in FIGS. 7-8B, a valve core mounting portion 11 is disposed in the valve body 10. The valve core mounting portion 11 is provided with a second recess 12, and both sides of the second recess 12 are provided with a valve rod positioning hole 13, wherein the connecting portion 211 of the valve core 21 is mounted in the second recess 12, and the valve rod 30 passes through the valve rod positioning hole 13 on the side of the valve body 10 and then passes through the second valve rod fitting hole 215 on the side of the connecting portion 211, and then passes through the first valve rod fitting hole 224 of the drive member 22, and then passes through the second valve rod fitting hole 215 on the other side of the connecting portion 211 and finally penetrates into the valve rod positioning hole 13 on the other side of the valve body 10, so that the valve core 20 is rotatably coupled to the valve body 10.

As shown in FIGS. 8-8B, a positioning member locking portion 14 is further disposed on the inner side wall of the valve body 10. The positioning member locking portion 14 is used for limiting the vertically position of the positioning member 24, so that when the positioning member 24 is stretched out and in the position, the positioning member 24 is locked by the positioning member locking portion 14, as will be described in detail below.

Figure 9:
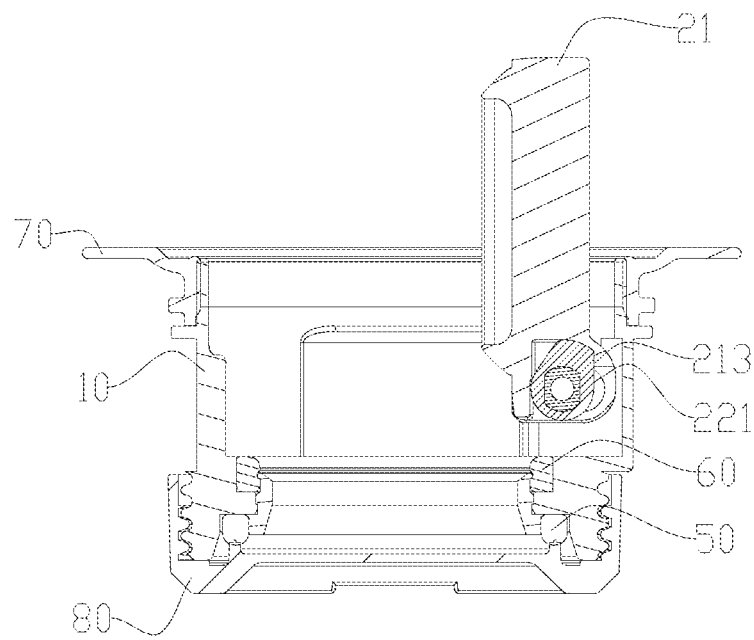
Figure 9A:
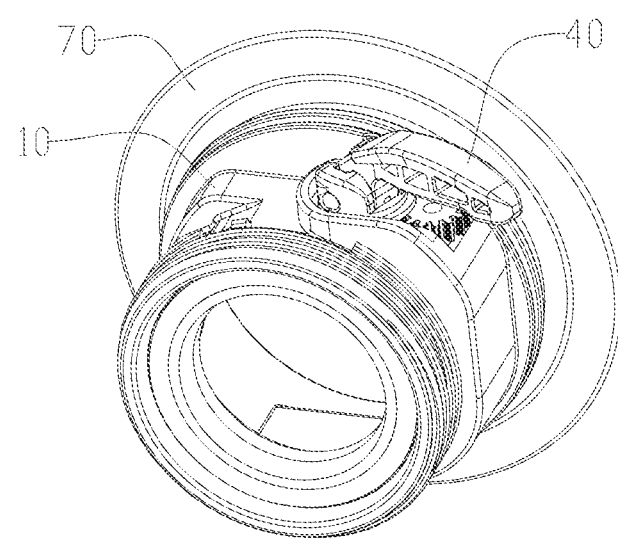
Figure 10:
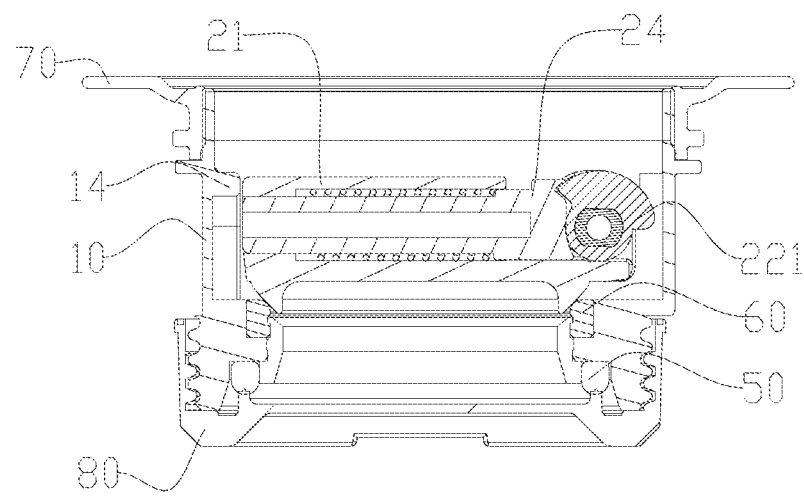
Figure 10A:
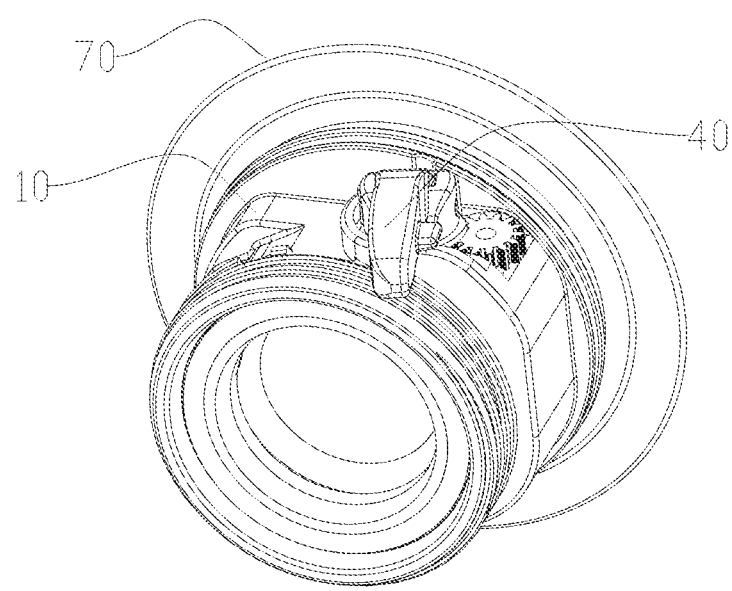
Figure 11:
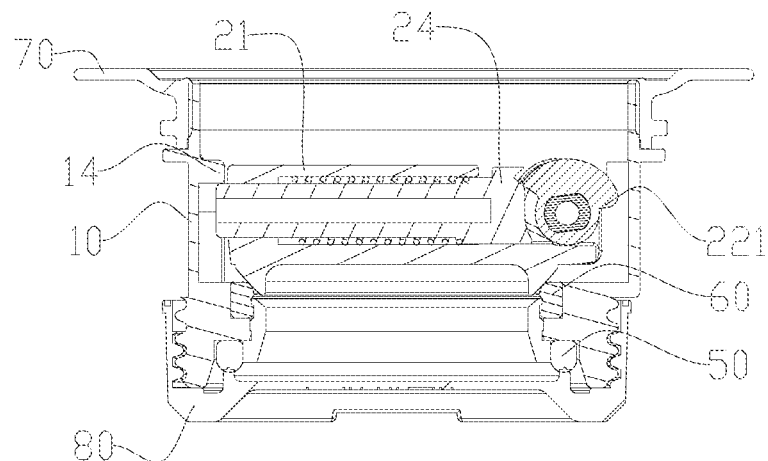
Figure 11A:
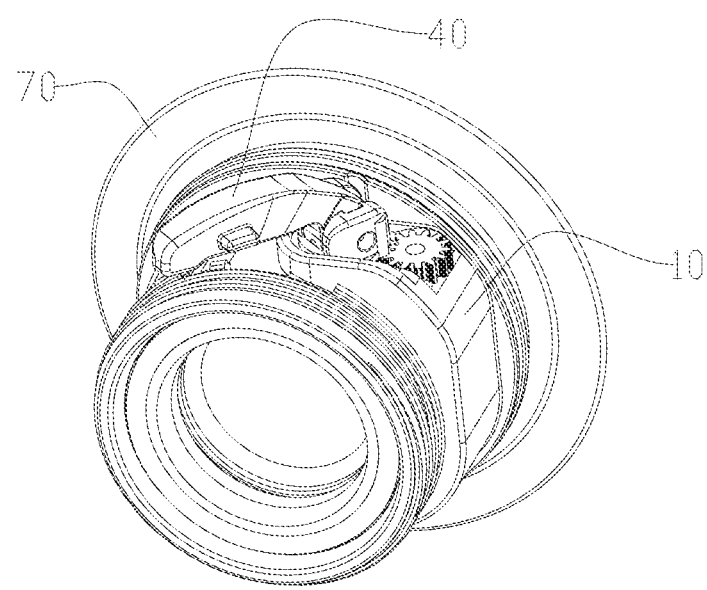
Figure 12:
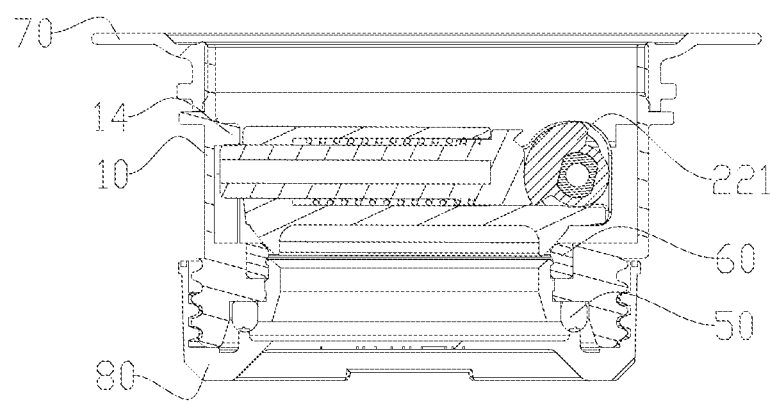
Figure 12A:
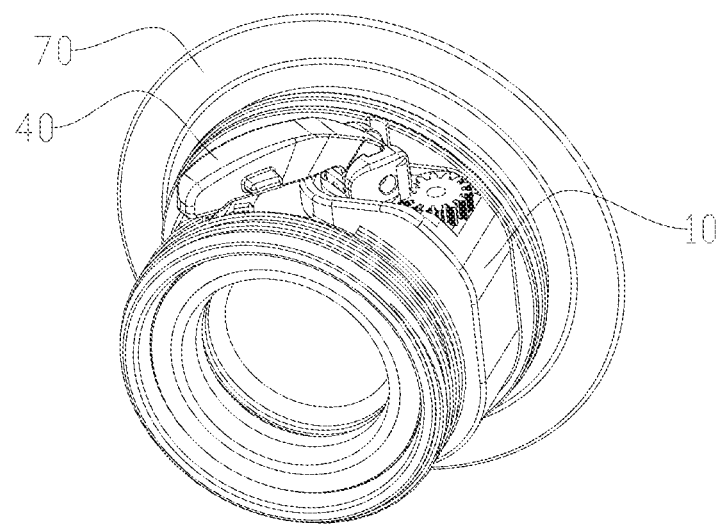
Figure 13:
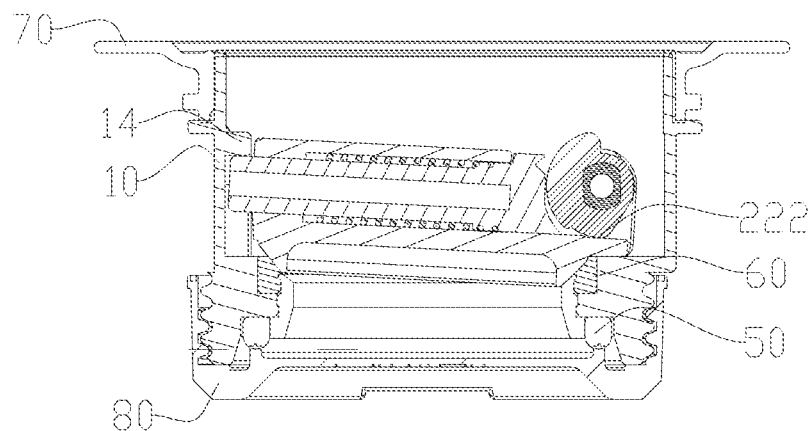
Figure 13A:
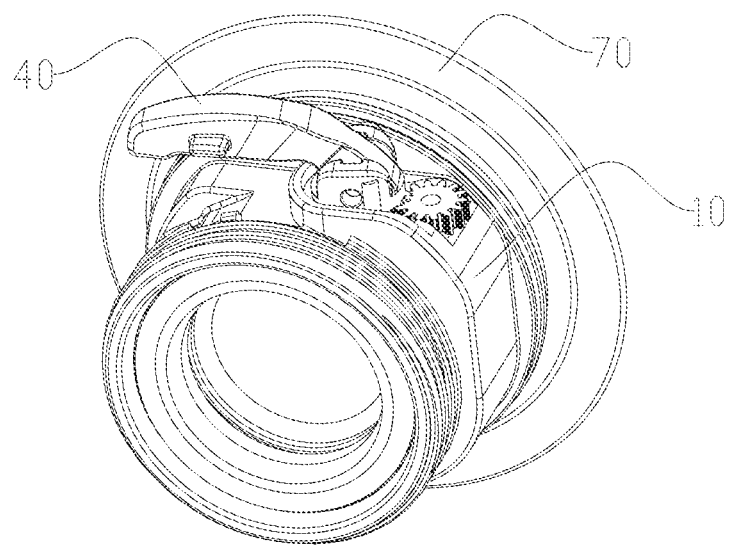

FIGS. 9-13A show the transmission relationship of the valve of the present invention during the closing process, wherein the FIGS. 9-9A show the valve open state, FIGS. 10-10A show the first transmission relationship, FIGS. 11-12A show the second transmission relationship, and FIGS. 13-13A show the third transmission relationship.

As shown in FIGS. 9-10A, during the changing process of the valve from the open state to the closed state, the drive member 22 cooperates with the positioning member 24 under the elastic action of the flexible member 23 to form a relatively static first transmission relationship, and the valve core 21 is driven to rotate to close the valve core 21. In the first transmission relationship, a force is applied to the valve core 21 by the positioning member 24 so as to close the valve core 21.

As shown in FIGS. 11-12A, when the first transmission relationship ends, the drive member 22 and the positioning member 24 are switched from the first transmission relationship to the second transmission relationship, and the drive member 22 presses the positioning member 24 to fore the positioning member 24 to move relative to the valve core 21. In the second transmission relationship, the control cam 223 on the drive member 22 cooperates with the cam engaging surface 241 on the positioning member 24, thereby the positioning member 24 is driven to be laterally moved in the positioning member rail 210 of the valve core 21 against the elastic force of the flexible member 23 by the downward rotation of the control cam 223 until the front end of the positioning member 24 protrudes below the positioning member locking portion 14 of the valve body 10, as shown in FIG. 12, at this time, the edge of the control cam 223 is in contact with the bottom of the first recess 212 of the valve core 21.

As shown in FIGS. 13-13A, when the second transmission relationship ends, the drive member 22 and the positioning member 24 are switched from the second transmission relationship to the third transmission relationship between the drive member 22 and the valve core 21, and the drive member 22 controls the positioning member 24 in the extended state, so that the positioning member 24 is always in the state of being engaged with the valve body 10. The drive member 22 presses the vale core 21 to perform a pressing movement in the valve through-hole radial direction, thereby sealingly locking the valve core. In the third transmission relationship, the drive member 22 is synchronously rotated by the valve rod 30, and the control cam on the drive member 22 controls the positioning member 24 always in the extended state, and the locking cam 222 on the drive member 22 cooperates with the locking boss 214 on the valve core 21. The control cam 222 apply a force to the locking boss 214, so that the drive member 22 presses the valve core 21 and the inner valve seat 60 to move in the valve through-hole radial direction under the action of the locking cam 222. During this movement, the positioning member 24 is always in the extended state, and forms a fulcrum rotational motion with the positioning member locking portion 14 of the valve body 10 until the valve rod 30 is rotated into position, and the valve core 21 is locked.

The transmission relationship of the valve opening process is opposite to the transmission relationship of the valve closing process, which will be readily understood by those skilled in the art and will not be described in detail herein. It should be noted that during the opening process of the valve, the drive member 22 realizes the force transmission through the cooperation of the hanging table 221 of the drive member 22 and the hanging table mating surface 213 of the valve core 21, that is, the hanging table 221 exerts a force to the hanging table mating surface 213 so as to achieve opening of the valve core 21.

In the present invention, as a preferred manner, the positioning member is a positioning rod, and the flexible member is a compression spring. However, those skilled in the art can understand that the positioning member can also adopt other forms, and the flexible member can also adopt other flexible member such as a rubber stopper or the like, and the positioning member and the flexible member may be integrally formed, reference to the following embodiments.

Although in the embodiments described above, the positioning member and the flexible member are separate members. However, in another embodiment, the positioning member and the flexible member may be a single piece. At this time, the flexible member is disposed on the positioning member, for example, by providing elastic ribs on the outer circumference of the positioning member, and at this time, the elastic rib is used as the flexible member. When the positioning member is installed in the guide rail of the valve core, the elastic rib is engaged with one end of the guide rail, so that the end of the guide rail applies a force to the elastic rib to unlock the positioning member.

In another embodiment, a groove may be provided on the positioning member. A flexible member is disposed in the groove, and a stopper portion (such as a stopper pin or a stopper post or the like extending downward from the upper side wall of the guide rail) is disposed in the guide rail. The stopping portion extends into the groove and compresses the flexible member, so that when the positioning member moves relative to the driving member, the flexible member applies an elastic force to the positioning member under the action of the stopping portion, thereby realizing the positioning member to be unlocked.

The valve of the present invention has advantages of fewer component parts, a simple manufacturing process, a simple structure, and good utilization of space, which allows the valve to be minimized, while the valve opening torque is small and the sealing effect is excellent.

The preferred embodiments of the present invention have been described in detail hereinabove, and it is understood that various modifications and changes may be made by those skilled in the art. These equivalent forms also fall within the scope defined by the claims appended hereto.

What claimed is:

1. A valve comprising a valve body, a valve rod, a valve seat and a valve core assembly, the valve core assembly being mounted in the valve body and including a valve core, the valve core being hinged to the valve body, wherein the valve core assembly further includes a drive member, a positioning member and a flexible member, wherein the positioning member is movably mounted on the valve core, and the flexible member is mounted between the positioning member and the valve core, and the drive member has a separable cooperating relationship with the positioning member, such that, corresponding to movement of the drive member, the valve has the following three drive relationships while it is being closed:

the drive member cooperates with the positioning member to form a relatively static first transmission relationship under elastic action of the flexible member and drives the valve core to rotate to close the valve core until the valve core reaches a first closed position; when the first transmission relationship ends, the drive member and the positioning member are switched from the first transmission relationship to a second transmission relationship, and the drive member presses the positioning member to make the positioning member perform relative movement with respect to the valve core until the positioning member is engaged with the valve body in an extended state; when the second transmission relationship ends, the drive member and the positioning member are switched from the second transmission relationship to a third transmission relationship between the drive member and the valve core, and the drive member controls the positioning member in the extended state, so that the positioning member is always engaged with the valve body, and the drive member presses the valve core to perform a pressing movement toward a valve through-hole radial direction, thereby sealingly locking the valve core in a second closed position.

2. The valve of claim 1, wherein the drive member is provided with a control cam, and an end of the positioning member is provided with a control cam engaging surface, wherein the control cam cooperates with the control cam engaging surface thereby realizing rotation of the drive member to drive the positioning member to slide.

3. The valve of claim 1, wherein the valve core is provided with a connecting portion, and the connecting portion is provided with a first recess, and the drive member is installed in the first recess, and a hanging table is disposed on the drive member, and a hanging table mating surface is disposed in the first recess, and opening of the valve is realized by cooperation of the hanging table and the hanging table mating surface.

4. The valve of claim 3, wherein the valve further comprises a valve rod, the drive member is provided with a first valve rod fitting hole, and both sides of the first recess of the connecting portion is disposed with a second valve rod fitting hole, and the valve rod extends into the first valve rod fitting hole and the second valve rod fitting hole, so that the rotation of the valve rod drives the drive member to rotate.

5. The valve of claim 4, wherein the valve body is provided with a valve core mounting portion, and the valve core mounting portion is provided with a second recess, and both sides of the second recess are provided with a valve rod positioning hole, wherein the connecting portion of the valve core is installed in the second recess, and the valve rod passes through the valve rod positioning hole, the first valve rod fitting hole, the second valve rod fitting hole and the connecting portion, so as to rotatably mount the valve core in the valve body.

6. The valve of claim 5, wherein the valve further comprises a handle provided with a driving gear, and the valve rod is provided with a driven gear for cooperating with the driving gear such that rotation of the handle drives the valve rod to rotate.

7. The valve of claim 1, wherein a locking cam is further disposed on the drive member, and a locking boss is disposed at a bottom of the first recess of the valve core, wherein the locking cam cooperates with the locking boss to achieve the third transmission relationship.

8. The valve of claim 1, wherein the valve core is provided with a positioning member guide rail, and the flexible member abuts against the positioning member and is mounted on the positioning member guide rail together with the positioning member.

9. The valve of claim 1, wherein the valve body is provided with a positioning member locking portion, and in the third transmission relationship, when the drive member controls the positioning member in an extended state, the positioning member locking portion limits position of the positioning member.

10. The valve of claim 1, wherein the valve further comprises a flange and a cover, and the valve seat comprises an outer valve seat and an inner valve seat, wherein the outer valve seat is disposed between the valve body and the cover, and the inner valve seat is disposed between the valve core and the valve body, and the cover is disposed at an outlet end of the valve body, and the flange is disposed at an inlet end of the valve body.

\* \* \* \* \*